(12) United States Patent
Kulovits et al.

(10) Patent No.: US 11,697,179 B2
(45) Date of Patent: Jul. 11, 2023

(54) ALUMINUM ALLOY BRAZING SHEETS FOR FLUXLESS BRAZING

(71) Applicant: ARCONIC TECHNOLOGIES LLC, Pittsburgh, PA (US)

(72) Inventors: Andreas Kulovits, Pittsburgh, PA (US); Tao Zhou, Lancaster, PA (US); Baolute Ren, Lititz, PA (US); Harry R. Zonker, Pittsburgh, PA (US)

(73) Assignee: ARCONIC TECHNOLOGIES LLC, Pittsburgh, PA (US)

( * ) Notice: Subject to any disclaimer, the term of this patent is extended or adjusted under 35 U.S.C. 154(b) by 0 days.

(21) Appl. No.: 17/597,846

(22) PCT Filed: Sep. 28, 2020

(86) PCT No.: PCT/US2020/053022
§ 371 (c)(1),
(2) Date: Jan. 26, 2022

(87) PCT Pub. No.: WO2021/067166
PCT Pub. Date: Apr. 8, 2021

(65) Prior Publication Data
US 2022/0281039 A1 Sep. 8, 2022

Related U.S. Application Data

(60) Provisional application No. 62/908,000, filed on Sep. 30, 2019.

(51) Int. Cl.
*B23K 35/28* (2006.01)
*B23K 35/02* (2006.01)
(Continued)

(52) U.S. Cl.
CPC ........ *B23K 35/286* (2013.01); *B23K 35/0238* (2013.01); *B32B 15/016* (2013.01); *C22C 21/08* (2013.01)

(58) Field of Classification Search
None
See application file for complete search history.

(56) References Cited

U.S. PATENT DOCUMENTS 7,255,932 B1 * 8/2007 Kilmer ................. B23K 35/286
165/905
10,898,963 B2 * 1/2021 Miyake ................. B23K 35/286
(Continued)

FOREIGN PATENT DOCUMENTS

CN 102089117 A 6/2011
EP 2065180 A1 6/2009
(Continued)

OTHER PUBLICATIONS

International Search Report and Written Opinion of the International Searching Authority for International Application No. PCT/US2020/053022 dated Jan. 13, 2021.

*Primary Examiner* — Daniel J. Schleis
(74) *Attorney, Agent, or Firm* — K&L Gates LLP

(57) ABSTRACT

New aluminum alloy brazing sheets are disclosed. The new aluminum alloy brazing sheets may include a core, an interliner layer adjacent the core, and a braze liner adjacent the interliner layer. The interliner layer may include a first aluminum alloy having at least 0.35 wt. % Si and from 0.05 to 2.0 wt. % Mg. The braze liner may include a second aluminum alloy having 0.05 to 2.0 wt. % Mg. The first aluminum alloy and the second aluminum alloy may include an amount of magnesium sufficient to achieve $T_{solidus}$(IL)≥5° C. $T_{liquidus}$(BL). The new aluminum alloy brazing products may be useful, for instance, in fluxfree brazing.

16 Claims, 2 Drawing Sheets

(51) Int. Cl.
*B32B 15/01* (2006.01)
*C22C 21/08* (2006.01)

(56) References Cited

U.S. PATENT DOCUMENTS

| | | |
|---|---|---|
| 2014/0227246 A1 | 8/2014 | Lee |
| 2015/0165564 A1 | 6/2015 | Ahl et al. |
| 2018/0141166 A1* | 5/2018 | Itoh ........................ C22C 21/10 |

FOREIGN PATENT DOCUMENTS

| | | |
|---|---|---|
| JP | 2005-523164 A | 8/2005 |
| JP | 5456920 B1 | 4/2014 |
| WO | 03/089237 A1 | 10/2003 |
| WO | 2018/140468 A1 | 8/2018 |
| WO | 2018/184806 A1 | 10/2018 |
| WO | 2020219032 A1 | 10/2020 |

* cited by examiner

ALUMINUM ALLOY BRAZING SHEETS FOR FLUXLESS BRAZING

BACKGROUND

Brazing of aluminum alloys involves melting a filler metal such that the melted filler metal flows into the interface between adjoining parts (e.g., by capillary action) and hardens upon cooling to join the metal parts. To successfully braze aluminum alloys, the surfaces to be joined and the filler metal need to be protected from oxidation. Vacuum brazing is a furnace joining technology that protects the parts from oxidation by effectively removing most of the oxygen from the brazing. The dominant method of furnace brazing today is Controlled Atmosphere Brazing (CAB) in which the parts are heated in a muffle furnace under a protective inert gas atmosphere (such as nitrogen) with relatively low oxygen content. In CAB brazing, a flux must be used to remove the oxide from the parts to be joined and to then protect the clean metal surfaces from oxidation by the residual oxygen in the furnace. Environmental health and safety (EHS) concerns may arise when residual flux remains on the brazed part.

DETAILED DESCRIPTION

Figure 1A:
FIG. 1a is a cross-sectional, schematic view of one embodiment of a three-layer brazing sheet.

Broadly, the present patent application relates to improved aluminum alloy brazing sheet products. As an example, and referring now to FIG. 1a, a brazing sheet (100) may include a core (120), an interliner layer ("interliner" or "IL") (140), and a braze liner layer ("braze liner" or "BL") (160). In one embodiment, the brazing sheet (100) is a sheet material for fluxfree CAB brazing. In the illustrated embodiment, the core (120) is disposed immediately adjacent a first side of the interliner (140), and the braze liner (160) is disposed immediately adjacent the other side of the interliner (140). The interliner (140) comprises a first aluminum alloy. The first aluminum alloy comprises at least 0.35 wt. % Si and from 0.05 to 2.0 wt. % Mg. The braze liner (160) comprises a second aluminum alloy, and the second aluminum alloy is a different composition than the first aluminum alloy. The second aluminum alloy comprises from 0.05 to 2.0 wt. % Mg. The first aluminum alloy and the second aluminum alloy both include an amount of magnesium sufficient to achieve $T_{solidus}(IL) \geq 5°$ C. $T_{liquidus}(BL)$. That is, by using appropriate amounts of magnesium in both the interliner layer (140) and the braze liner (160), the solidus temperature of the interliner ($T_{solidus}(IL)$ may be tailored such that it is at least 5° C. higher than the liquidus temperature of the braze liner ($T_{liquidus}(BL)$). Accordingly, any melting of the interliner (IL) will occur after the braze liner has achieved its liquidus temperature. For instance, assuming the maximum temperature of a brazing cycle is $T_{max}$(braze cycle), when $T_{solidus}(IL) > T_{max}$(braze cycle), then the interliner remains solid at all times. If $T_{max}$(braze cycle)$> T_{solidus}(IL) > T_{liquidus}(BL)$, then the interliner remains solid until after the braze liner has achieved its liquidus temperature. Accordingly, improved fluxfree brazing sheet products are provided, which products generally avoid (a) premature dissolution/corrosion of the core, (b) premature diffusion of elements from one layer to another, or (c) both (a) and (b).

As used in this patent application, "fluxfree brazing" and the like means brazing in an inert atmosphere with residual oxygen but without intentional use of fluoride or other nonmetallic based flux agents. Residual flux existing in the furnace may (while not desired) be tolerated. Flux agents are typically applied through direct application of flux to the brazing sheet (part) itself or by incorporation of the flux agent into the braze alloy. Typical flux agents include $KAlF_4$ and $CsAlF_4$. Typical flux agent levels used in fluxed brazing are around 4 to 6 grams per square meter.

i. Interliner

As noted above, the interliner (140) generally comprises a first aluminum alloy, and the first aluminum alloy comprises at least 0.35 wt. % Si and from 0.05 to 2.0 wt. % Mg. The magnesium may, for instance, at least partially facilitate an appropriate solidus temperature of the first aluminum alloy. The magnesium may also, for instance, facilitate fluxfree brazing by restricting/preventing $Al_2O_3$ formation and/or scavenging free oxygen during a braze cycle. In one embodiment, the first aluminum alloy comprises at least 0.10 wt. % Mg. In another embodiment, the first aluminum alloy comprises at least 0.15 wt. % Mg. In another embodiment, the first aluminum alloy comprises at least 0.20 wt. % Mg. In one embodiment, the first aluminum alloy comprises not greater than 1.5 wt. % Mg. In another embodiment, the first aluminum alloy comprises not greater than 1.0 wt. % Mg. In yet another embodiment, the first aluminum alloy comprises not greater than 0.8 wt. % Mg. In another embodiment, the first aluminum alloy comprises not greater than 0.6 wt. % Mg.

The silicon of the first aluminum alloy may facilitate, for instance, roll bonding, controlled diffusion of silicon to the core (e.g., to enable formation of AlSiMn particles in the core, which may restrict/prevent corrosion of the core), and/or an appropriate solidus temperature of the first aluminum alloy. In one embodiment, the first aluminum alloy comprises at least 0.35 wt. % Si and in an amount sufficient such that $T_{solidus}(IL) \geq 5°$ C. $T_{liquidus}(BL)$. In one embodiment, the first aluminum alloy includes not greater than 1.0 wt. % Si. In one embodiment, the weight ratio of silicon-to-magnesium of the first aluminum alloy is not greater than 1:2 (wt. % Si:wt. % Mg). A weight ratio of silicon-to-magnesium of not greater than 1:2 may facilitate, for instance, roll bonding.

The first aluminum alloy may optionally include other elements. For instance, in one embodiment, the first aluminum alloy includes bismuth. The use of bismuth may facilitate, for instance, formation of $Mg_3Bi_2$ compounds, which have a solvus temperature of about 580° C. Thus, in some embodiments, the first aluminum alloy includes up to 0.12 wt. % Bi. In one embodiment, the first aluminum alloy includes from 0.01 to 0.12 wt. % Bi.

The first aluminum alloy may optionally include up to 2.0 wt. % Zn. Zinc may, for instance, improve corrosion resistance in some brazing sheet products. The first aluminum alloy may include up to 1.15 wt. % Mn and/or up to 0.40 wt. % Fe. In one embodiment, the first aluminum alloy includes an amount of manganese and iron sufficient to increase the solidus of the first aluminum alloy (e.g., through formation of $Al_x(Mn,Fe)_ySi_z$ compounds, or similar, which may restrict silicon in solid solution). In one embodiment, a first aluminum alloy includes at least 0.05 wt. % Mn. In another embodiment, a first aluminum alloy includes at least 0.10 wt.

% Mn. In one embodiment, a first aluminum alloy includes at least 0.05 wt. % Fe. In another embodiment, a first aluminum alloy includes at least 0.10 wt. % Fe. The first aluminum alloy may include up to 0.1 wt. % Cu and/or up to 0.05 wt. % Ti.

In one embodiment, a first aluminum alloy includes:
0.05 to 2.0 wt. % Mg (such as any of the Mg amounts described above);
0.35 to 1.0 wt. % Si (such as any of the Si amounts described above);
up to 0.12 wt. % Bi (such as any of the Bi amounts described above);
up to 2.0 wt. % Zn;
up to 1.15 wt. % Mn (such as any of the Mn amounts described above);
up to 0.4 wt. % Fe (such as any of the Fe amounts described above);
up to 0.1 wt. % Cu; and
up to 0.05 wt. % Ti;
the balance being aluminum, incidental elements and impurities.

As used herein, "incidental elements" means those elements or materials, other than those listed above, that may optionally be added to the alloy to assist in the production of the alloy. Examples of incidental elements include casting aids, such as grain refiners and deoxidizers.

ii. Braze Liner

As noted above, the braze liner (160) generally comprises a second aluminum alloy having from 0.05 to 2.0 wt. % Mg. Similar to the first aluminum alloy, the magnesium of the second aluminum may, for instance, at least partially facilitate an appropriate liquidus temperature of the second aluminum alloy. The magnesium may also, for instance, facilitate fluxfree brazing by restricting/preventing $Al_2O_3$ formation and/or scavenging free oxygen during a braze cycle. In one embodiment, the second aluminum alloy comprises at least 0.10 wt. % Mg. In another embodiment, the second aluminum alloy comprises at least 0.15 wt. % Mg. In another embodiment, the second aluminum alloy comprises at least 0.20 wt. % Mg. In one embodiment, the second aluminum alloy comprises not greater than 1.5 wt. % Mg. In another embodiment, the second aluminum alloy comprises not greater than 1.0 wt. % Mg. In yet another embodiment, the second aluminum alloy comprises not greater than 0.8 wt. % Mg. In another embodiment, the second aluminum alloy comprises not greater than 0.6 wt. % Mg.

In one embodiment, both the first aluminum alloy and the second aluminum alloy include at least 0.10 wt. % Mg. In one embodiment, the combined amount of magnesium in the first aluminum alloy and the second aluminum alloy is not greater than 1.5 wt. % Mg, i.e., wt. % Mg(IL)+wt. % Mg(BL)≤1.5 wt. %. In another embodiment, the combined amount of magnesium in the first aluminum alloy and the second aluminum alloy is not greater than 1.0 wt. % Mg, i.e., wt. % Mg(IL)+wt. % Mg(BL)≤1.0 wt. %.

The second aluminum alloy may optionally include other elements. For instance, in one embodiment, like the first aluminum alloy, the second aluminum alloy may include bismuth, which may facilitate formation of $Mg_3Bi_2$ compounds, which compounds have a solvus temperature of about 580° C. Thus, in some embodiments, the second aluminum alloy includes up to 0.12 wt. % Bi. In one embodiment, the second aluminum alloy includes from 0.01 to 0.12 wt. % Bi. In one embodiment, only one of the first aluminum alloy and the second aluminum alloy include bismuth. In another embodiment, both the first aluminum alloy and the second aluminum alloy include bismuth, ad wherein the combined amount of bismuth in the first aluminum alloy and the second aluminum alloy is from 0.01 to 0.12 wt. % Bi.

In one embodiment, the second aluminum alloy is a 4xxx aluminum alloy, as defined by the "International Alloy Designations and Chemical Composition Limits for Wrought Aluminum and Wrought Aluminum Alloys" (2015), issued by the Aluminum Association, a.k.a. "the Teal Sheets." Such 4xxx aluminum alloys may include any of the magnesium and bismuth amounts disclosed herein. Such 4xxx aluminum alloys may also include, for instance, from 50 ppm to 500 ppm of sodium (Na), strontium (Sr), antimony (Sb), or combinations thereof, which elements may facilitate refining the silicon eutectic of applicable 4xxx aluminum alloys. In one embodiment, a 4xxx aluminum alloy may include at least 80 ppm of sodium, strontium, antimony, or combinations thereof. In another embodiment, a 4xxx aluminum alloy may include at least 100 ppm of sodium, strontium, antimony, or combinations thereof. In one embodiment, a 4xxx aluminum alloy may include not greater than 400 ppm of sodium, strontium, antimony, or combinations thereof. In another embodiment, a 4xxx aluminum alloy may include not greater than 300 ppm of sodium, strontium, antimony, or combinations thereof. In one embodiment, the second aluminum alloy is one of a 4045, 4047 or 4343-style aluminum alloy having any of the magnesium, bismuth, sodium, strontium, or antimony levels described above.

iii. Core

The core (120) generally is an aluminum alloy. In one embodiment, the core (120) comprises one of a 2xxx, 3xxx, 5xxx or 6xxx aluminum alloy as defined by the Teal Sheets. In one embodiment, the core (120) is a 3xxx aluminum alloy. In one embodiment, the core (120) is a 3003-style aluminum alloy. In one embodiment, the core is essentially free of magnesium, i.e., includes less than 0.05 wt. % Mg. In other embodiments, the core (120) comprises at least 0.05 wt. % Mg. In one embodiment, the core (120) comprises a sufficient amount of magnesium such that, during a braze cycle, the magnesium of the core (a) dissolves $Al_2O_3$ created on a surface of the brazing sheet, (b) evaporates into an atmosphere of the braze cycle and reacts with oxygen, or (c) both (a) and (b). In one embodiment, the core (120) comprises from 0.10 to 1.0 wt. % Mg.

iv. Brazing Sheet Products

As noted above, in one embodiment, the brazing sheet (100) may be a sheet material for fluxfree CAB brazing. In one embodiment, the core has from 60% to 90% of a total thickness of the sheet material, the interliner layer from 3% to 20% of the total thickness of the sheet material, and the braze liner layer from 3% to 20% of the total thickness of the sheet material.

In one embodiment, a structure includes: a first part made from aluminum, a second part made from the brazing sheet (100), the first part and the second part joined together by a brazed joint at least partially formed from the brazing liner layer of the second part. In another embodiment, the structure is a portion of a heat exchanger such as an oil cooler or radiator.

Figure 1B:
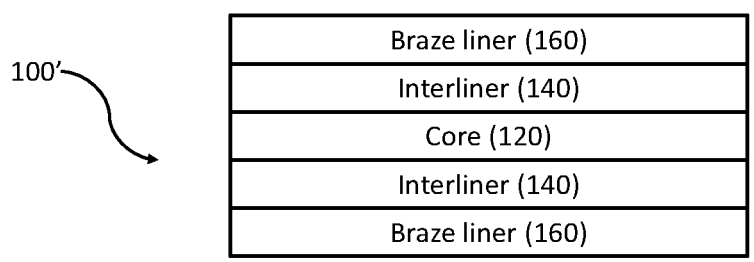
FIG. 1b is a cross-sectional, schematic view of one embodiment of a five-layer brazing sheet.

Referring now to FIG. 1*b*, another embodiment of a brazing sheet (100') is shown. This brazing sheet (100') comprises a core (120), two interliners (140) on each side of the core (120), and two braze liners (160), each adjacent a respective interliner. The core (120), interliners (140), and braze liners (160) may be any of those described in sections (i)-(iii), above.

Figure 1C:
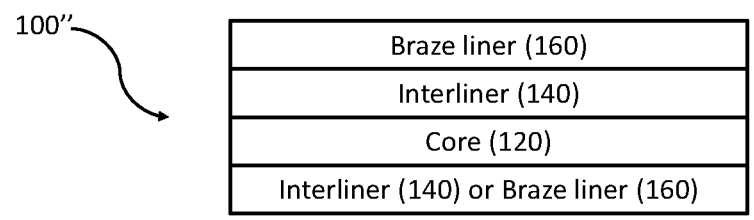
FIG. 1c is a cross-sectional, schematic view of one embodiment of a four-layer brazing sheet.

Referring now to FIG. 1c, another embodiment of a brazing sheet (100") is shown. This brazing sheet (100") comprises a core (120), a interliner (140) on a first side of the core (120), and a braze liner (160) adjacent this interliner. Either an interliner (140) or a braze liner (160) is located adjacent the second side of the core (120). The core (120), interliner(s) (140), and braze liner(s) (160) may be any of those described in sections (i)-(iii), above.

These and other aspects, advantages, and novel features of this new technology are set forth in part in the description that follows and will become apparent to those skilled in the art upon examination of the following description and figures, or may be learned by practicing one or more embodiments of the technology provided for by the present disclosure.

The figures constitute a part of this specification and include illustrative embodiments of the present disclosure and illustrate various objects and features thereof. In addition, any measurements, specifications and the like shown in the figures are intended to be illustrative, and not restrictive. Therefore, specific structural and functional details disclosed herein are not to be interpreted as limiting, but merely as a representative basis for teaching one skilled in the art to variously employ the present invention.

Among those benefits and improvements that have been disclosed, other objects and advantages of this invention will become apparent from the following description taken in conjunction with the accompanying figures. Detailed embodiments of the present invention are disclosed herein; however, it is to be understood that the disclosed embodiments are merely illustrative of the invention that may be embodied in various forms. In addition, each of the examples given in connection with the various embodiments of the invention is intended to be illustrative, and not restrictive.

Throughout the specification and claims, the following terms take the meanings explicitly associated herein, unless the context clearly dictates otherwise. The phrases "in one embodiment" and "in some embodiments" as used herein do not necessarily refer to the same embodiment s), though it may. Furthermore, the phrases "in another embodiment" and "in some other embodiments" as used herein do not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references, unless the context clearly dictates otherwise. The meaning of "in" includes "in" and "on", unless the context clearly dictates otherwise.

While various embodiments of the new technology described herein have been described in detail, it is apparent that modifications and adaptations of those embodiments will occur to those skilled in the art. However, it is to be expressly understood that such modifications and adaptations are within the spirit and scope of the presently disclosed technology.

What is claimed is:

1. A brazing sheet comprising:
   (a) an aluminum alloy core;
   (b) an interliner layer (IL) adjacent the core;
   wherein, the interliner layer (IL) comprises a first aluminum alloy, wherein the first aluminum alloy comprises 0.35 wt. % to 1.0 wt. % Si and 0.1 to 2.0 wt. % Mg;
   (c) a braze liner (BL) adjacent the interliner layer (IL);
   wherein the braze liner (BL) comprises a second aluminum alloy, wherein the second aluminum alloy is different than the first aluminum alloy, and wherein the second aluminum alloy comprises 0.1 to 2.0 wt. % Mg;
   wherein the first aluminum alloy and the second aluminum alloy include an amount of magnesium sufficient to achieve $T_{solidus}(IL) \geq 5° C. T_{liquidus}(BL)$.

2. The brazing sheet of claim 1, wherein the first aluminum alloy has a weight ratio of silicon-to-magnesium of not greater than 1:2 (wt. % Si:wt. % Mg).

3. The brazing sheet of claim 1, wherein a combined amount of magnesium in the first aluminum alloy and the second aluminum alloy is not greater than 1.5 wt. % Mg.

4. The brazing sheet of claim 1, wherein the first aluminum alloy comprises from 0.01 to 0.12 wt. % Bi.

5. The brazing sheet of claim 1, wherein the second aluminum alloy comprises from 0.01 to 0.12 wt. % Bi.

6. The brazing sheet of claim 1, wherein a combined amount of bismuth in the first aluminum alloy and the second aluminum alloy is from 0.01 to 0.12 wt. % Bi.

7. The brazing sheet of claim 1, wherein the first aluminum alloy comprises a sufficient amount of silicon such that $T_{solidus}(IL) \geq 5° C. T_{liquidus}(BL)$.

8. The brazing sheet of claim 1, wherein the first aluminum alloy comprises not greater than 0.6 wt. % Mg.

9. The brazing sheet of claim 8, wherein the first aluminum alloy comprises less magnesium than the second aluminum alloy, in weight percentages.

10. The brazing sheet of claim 1, wherein the first aluminum alloy comprises:
    up to 0.12 wt. % Bi;
    up to 2.0 wt. % Zn;
    up to 1.15 wt. % Mn;
    up to 0.4 wt. % Fe;
    up to 0.1 wt. % Cu; and
    up to 0.05 wt. % Ti.

11. The brazing sheet of claim 1, wherein the second aluminum alloy is a 4xxx aluminum alloy.

12. The brazing sheet of claim 11, wherein the aluminum alloy core comprises one of a 2xxx, 3xxx, 5xxx and 6xxx aluminum alloy.

13. The brazing sheet of claim 12, wherein the core comprises at least 0.05 wt. % Mg.

14. The brazing sheet of claim 13, wherein the core comprises a sufficient amount of magnesium such that, during a braze cycle, the magnesium of the core (a) dissolves $Al_2O_3$ created on a surface of the brazing sheet, (b) evaporates into an atmosphere of the braze cycle and reacts with oxygen, or (c) both (a) and (b).

15. The brazing sheet of claim 14, wherein the core comprises from 0.10 to 1.0 wt. % Mg.

16. The brazing sheet of claim 11, wherein the second aluminum alloy comprises from 50 to 500 ppm of sodium (Na), strontium (Sr), antimony (Sb) or combinations thereof.

* * * * *